United States Patent
Counterman

(10) Patent No.: US 9,635,010 B2
(45) Date of Patent: Apr. 25, 2017

(54) NETWORK-BASED AUTHENTICATION FOR THIRD PARTY CONTENT

(71) Applicant: Verizon Patent and Licensing Inc., Arlington, VA (US)

(72) Inventor: Raymond C. Counterman, Canton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/304,407

(22) Filed: Jun. 13, 2014

(65) Prior Publication Data
US 2015/0365403 A1  Dec. 17, 2015

(51) Int. Cl.
*H04L 29/06* (2006.01)
*H04L 9/32* (2006.01)

(52) U.S. Cl.
CPC ........ *H04L 63/0807* (2013.01); *H04L 9/3247* (2013.01); *H04L 9/3297* (2013.01); *H04L 63/0823* (2013.01); *H04L 63/0876* (2013.01); *H04L 63/102* (2013.01); *H04L 63/107* (2013.01); *H04L 63/108* (2013.01); *H04L 63/18* (2013.01)

(58) Field of Classification Search
CPC . H04L 63/08; H04L 63/0807; H04L 63/0853; H04L 63/0876; H04L 63/10; H04L 63/102; H04L 63/108; H04L 9/32; H04L 9/3247; H04L 9/3297
See application file for complete search history.

(56) References Cited

U.S. PATENT DOCUMENTS

| | | | | |
|---|---|---|---|---|
| 6,971,017 B2* | 11/2005 | Stringer | ............. | G06F 21/6209 713/182 |
| 7,137,006 B1* | 11/2006 | Grandcolas | ............. | G06F 21/41 713/180 |
| 8,442,498 B2* | 5/2013 | Yin | ..................... | H04L 63/0823 455/414.1 |
| 8,543,813 B2* | 9/2013 | Feng | ..................... | G06Q 10/02 380/255 |
| 8,838,501 B1* | 9/2014 | Priebatsch | ............. | G06Q 20/40 705/26.41 |
| 8,875,245 B2* | 10/2014 | Tamura | ............... | H04L 63/0884 705/52 |

OTHER PUBLICATIONS

D. Hardt, "The OAuth 2.0 Authorization Framework," Internet Engineering Task Force Request for Comments 6749, Oct. 2012 (available at http://www.rfc-editor.org/rfc/rfc6749.txt, visited May 2014).

* cited by examiner

*Primary Examiner* — Zachary A Davis

(57) ABSTRACT

A system may be configured to allow for network-based authentication of a user device, which may reduce or eliminate the need for a user to provide credentials. The authentication may be performed when the user device attempts to access content provided by a third party content provider. The network-based authentication may be performed by, or in conjunction with, a device that (a) is associated with the same telecommunications network as the user device, and (b) can authenticate the identity of the user device.

20 Claims, 12 Drawing Sheets

700

| MDN | Username | Password | Address | Other |
|---|---|---|---|---|
| 123-456-7890 | Ray123 | 1234 | 123 Fake St. | |
| 321-654-0987 | JohnDoe456 | password12 | 742 Evergreen Terrace | |
| 890-567-1234 | JaneDoe789 | Zx&3sd$3#~1 | 13 Elm St. | |
| 132-465-7980 | JohnDoe123 | 1111 | 1600 PA Ave. NW | |

FIG. 7

NETWORK-BASED AUTHENTICATION FOR THIRD PARTY CONTENT

BACKGROUND

Networks, such as the Internet, allow users to access content, such as web pages. Content can often be tailored specifically to a user, such as content based on the user's location, preferences, demographical information, and/or other information. Some content may include content that should be kept secure, such as financial content, user account content, and/or other types of secure content. In order to provide secure and/or tailored content, content providers often request that a user provide credentials (such as a username and password), so that the content provider can authenticate and/or identify the user.

BRIEF DESCRIPTION OF THE DRAWINGS

FIG. 7 illustrates an example data structure, which may store user authentication and/or identification information;

DETAILED DESCRIPTION OF PREFERRED EMBODIMENTS

The following detailed description refers to the accompanying drawings. The same reference numbers in different drawings may identify the same or similar elements.

Figure 1:
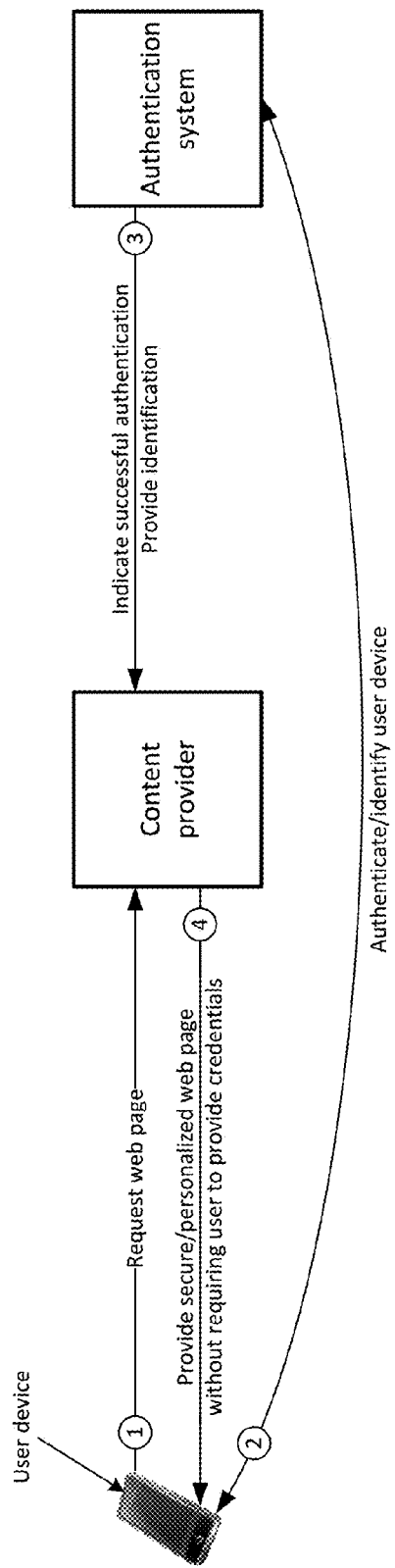
FIG. 1 illustrates an example overview of one or more implementations described herein.

As provided herein, some implementations may allow for the automated authentication of a user device with respect to content (e.g., a secure or personalized web page) being accessed by the user device. For example, as shown in FIG. 1, a user device may output (at arrow 1) a request for a web page. The request may be, for example, a Hypertext Transport Protocol ("HTTP") request for a web page provided by a content provider. The user device may also send (at arrow 2) an authentication request to an authentication system. As described herein, the authentication request may include information identifying the user device (e.g., a mobile device number ("MDN") associated with the user device).

The authentication system may authenticate and/or identify the user device based on the request. For example, the authentication system may authenticate the user device based on identifying that the user device is a "trusted" device that has been registered with the authentication system. The authentication system may, in some implementations, maintain a profile associated with the user device, which may include information regarding a user of the user device (e.g., name, address, present location, etc.). Based on authenticating the user device, the authentication system may provide (at arrow 3) an indication, to the content provider, that the user device has been authenticated, as well as identification information (e.g., information from the above-mentioned profile) associated with the user device.

Based on the authentication and identification information, the content provider may provide (at arrow 4) a secure and/or a personalized web page to the user device. For example, the secure and/or personalized web page may be a web page with financial information, weather information based on the user device's present location, advertisements and/or content based on the user's past browsing activity or preferences, and/or other content which would traditionally be associated with a "logged in" user. By authenticating and identifying a user device, according to techniques described herein, the need to request authentication credentials from a user may be eliminated or reduced, thereby enhancing the user's experience.

Figure 2:
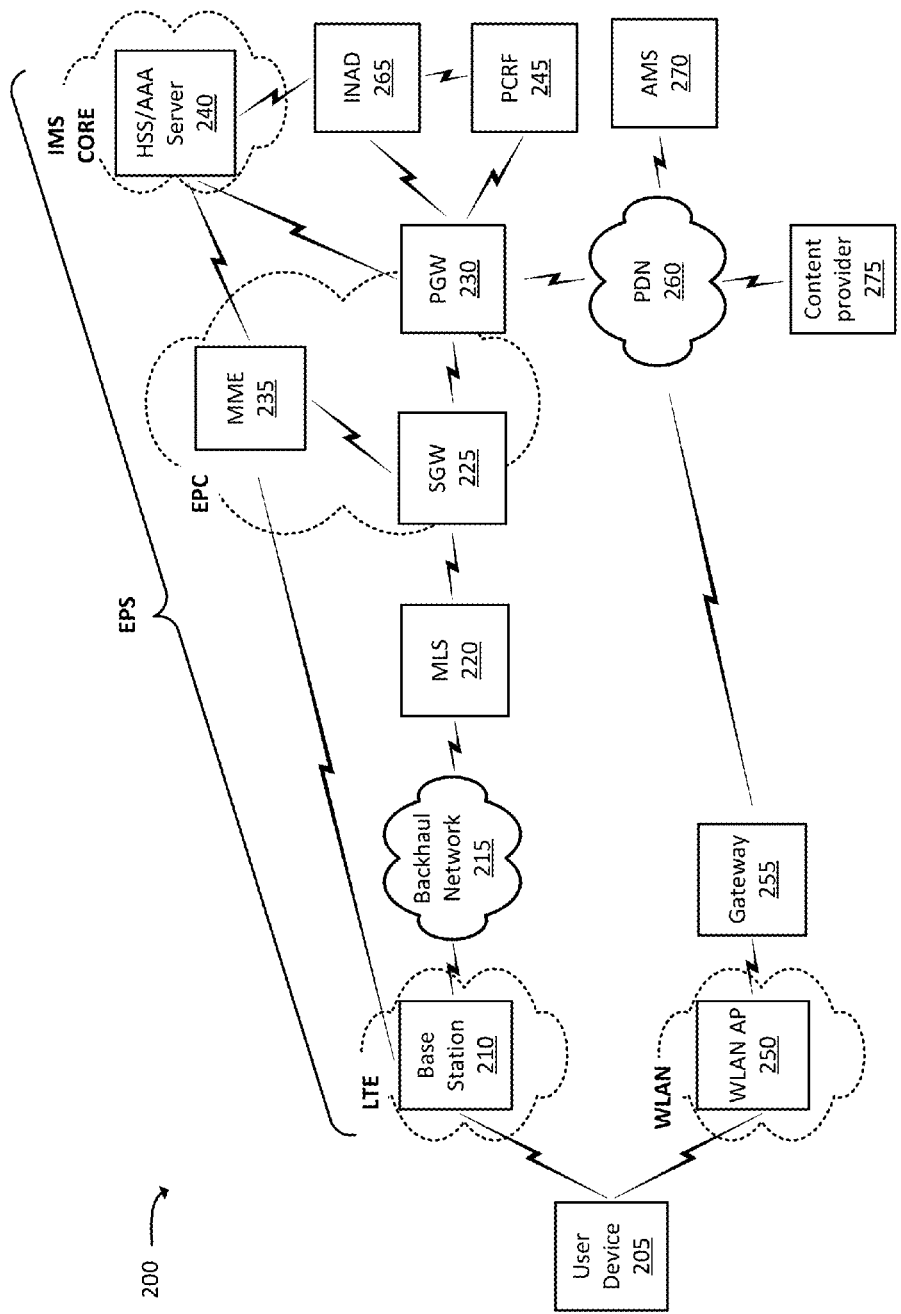
FIG. 2 illustrates an example environment, in which systems and/or methods, described herein, may be implemented.

FIG. 2 illustrates example environment 200, respectively, in which systems and/or methods described herein may be implemented. As shown in FIG. 2, environment 200 may include user device 205, base station 210, backhaul network 215, multi-layer switch ("MLS") 220, serving gateway ("SGW") 225, packet data network ("PDN") gateway ("PGW") 230, mobility management entity device ("MME") 235, home subscriber server ("HSS")/authentication, authorization, accounting ("AAA") server 240 (hereinafter referred to as "HSS/AAA server 240"), policy charging and rules function ("PCRF") 245, wireless local area network access point ("WLAN AP") 250, gateway 255, PDN 260, in-network authentication device ("INAD") 265, authentication management system ("AMS") 270, and content provider 275.

Environment 200 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 210, some or all of which may take the form of an evolved Node B ("eNB"), via which user device 205 may communicate with the EPC network. The EPC network may include one or more SGWs 225, PGWs 230, and/or MMES 235, and may enable user device 205 to communicate with PDN 260 and/or an Internet protocol ("IP") multimedia subsystem ("IMS") core network. The IMS core network may include HSS/AAA server 240, and may manage authentication, session initiation, account information, a user profile, etc., associated with user device 205.

User device 205 may include any computation and communication device, such as a wireless mobile communication device that is capable of communicating with base station 210 and/or PDN 260. For example, user device 205 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 205 may send traffic to and/or receive traffic from PDN 260 via base station 210, backhaul network 215, MLS 220, SGW 225, and/or PGW 230. As described herein, user device 205 may include logic and/or circuitry to communicate with INAD 265 and/or AMS 270, in order to aid in the automatic authentication of user device 205 when user device 205 requests content from content provider 275.

Base station 210 may include one or more network devices that receive, process, and/or transmit traffic, such as calls, audio, video, text, and/or other data, destined for and/or received from user device 205. In one example, base station 210 may be an eNB device and may be part of the LTE network. Additionally, or alternatively, one or more other base stations 210 may be associated with a RAN that is not associated with the LTE network (e.g., a wireless hot spot, a wireless access point, etc.). Base station 210 may receive traffic from and/or send traffic to content provider 275 via SGW 225, PGW 230, WLAN AP 250, gateway 255, and/or PDN 260. Base station 210 may send traffic to and/or receive traffic from user device 205 via, for example, an air interface (e.g., a cellular air interface), and WLAN AP 250 may send and/or receive traffic to and/or from user device 210 via another air interface (e.g., a Wi-Fi air interface).

Backhaul network 215 may include one or more networking devices (e.g., routers and/or switches) and links (e.g., fiber or coaxial links), that connect base station 210 to a core network (e.g., a core network that includes and/or is associated with MLS 220, SGW 225, and/or PGW 230).

MLS 220 may include one or more network devices that perform switching functionality on traffic received from SGW 225 and/or backhaul network 215. MLS 220 may operate multiple layers of the Open Systems Interconnection ("OSI") reference model, in contrast with other types of switches that traditionally operate only on the Data Link Layer ("DLL"). For example, MLS 220 may perform deep packet inspection to perform routing functions.

SGW 225 may include one or more network devices that gather, process, search, store, and/or provide information in a manner described herein. SGW 225 may, for example, aggregate traffic received from one or more base stations 210 and may send the aggregated traffic to PDN 260 via PGW 230.

PGW 230 may include one or more network devices that gather, process, search, store, and/or provide information in a manner described herein. PGW 230 may aggregate traffic received from one or more SGWs 225, etc. and may send the aggregated traffic to PDN 260. PGW 230 may also, or alternatively, receive traffic from PDN 260 and may send the traffic toward user device 205 via base station 210, SGW 225, WLAN AP 250, and/or gateway 255.

MME 235 may include one or more computation and communication devices that perform operations to register user device 205 with the EPS, to establish bearer channels associated with a session with user device 205, to hand off user device 205 from the EPS to another network, to hand off user device 205 from the other network to the EPS, and/or to perform other operations. MME 235 may perform policing operations on traffic destined for and/or received from user device 205.

HSS/AAA server 240 may include one or more devices that manage, update, and/or store, in a memory associated with HSS/AAA server 240, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber (e.g., a subscriber associated with user device 205); information regarding services to which particular subscribers are subscribed (e.g., communication services, such as video conferencing services, voice chat services, etc.); and/or other information. Additionally, or alternatively, HSS/AAA server 240 may perform authentication, authorization, and/or accounting operations associated with the subscriber and/or a communication session with user device 205.

PCRF 245 may include one or more devices that aggregate information to and from the EPC network and/or other sources. PCRF 245 may receive information regarding policies and/or subscriptions from one or more sources, such as subscriber databases and/or from one or more users (such as, for example, an administrator associated with PCRF 245).

WLAN AP 250 may include one or more devices that receive, process, and/or transmit traffic to and/or from user device 205. WLAN AP 250 may implement, or be used to implement, a WLAN. For example, WLAN AP 250 may send traffic to and/or receive traffic from user device 205 via an air interface, and may forward traffic, associated with user device 205, to and/or from PDN 260. The air interface between user device 205 and WLAN AP 250 may correspond to a frequency band that is not associated with cellular communication (e.g., an unlicensed frequency band, which has not been licensed by a governmental entity). For instance, the air interface between user device 205 may correspond to a Wi-Fi technology (e.g., an Institute of Electrical and Electronics Engineers Institute of Electrical and Electronics Engineers ("IEEE") 802.11-based technology), a Bluetooth® technology, and/or another wireless communication technology. In some implementations, WLAN AP 250 may include, or may be associated with, a router, a switch, and/or another type of networking device.

Gateway 255 may include one or more devices that receive, process, and/or transmit traffic between WLAN AP 250 and PDN 260. For example, gateway 255 may be, and/or may include, a modem that receives signals from PDN 260 via a coaxial and/or a fiber interface, and outputs corresponding digital signals to WLAN AP 250. For example, gateway 255 may include a wired interface (e.g., an Ethernet interface) via which signals are sent to and/or received from WLAN AP 250. In some implementations, WLAN AP 250 and gateway 255 may be implemented as a single, integrated device.

PDN 260 may include one or more wired and/or wireless networks. For example, PDN 260 may include a packet data network ("PDN"), such as an Internet Protocol ("IP")-based PDN. PDN 260 may include, for example, a wide area network ("WAN") such as the Internet, a core network of a telecommunications provider, a private enterprise network, and/or one or more other networks. User device 205 may connect, through PGW 230, to data servers, application servers, other user devices 205, content provider 275, and/or to other servers or applications that are coupled to PDN 260.

INAD 265 may include one or more computing devices that perform authentication services when user device 205 is connected to the same network, of which INAD 265 is a part. For example, INAD 265 may be provided by a wireless telecommunications provider that is also associated with base station 210 and/or one or more other devices shown in FIG. 2. INAD 265 may, in some implementations, be reachable by user device 205 only when user device 205 is connected to the same network as INAD 265. For instance, INAD 265 may be associated with a private address (e.g., a private or internal IP address, a private Session Initiation Protocol ("SIP") address, and/or another private identifier), which may not be able to be resolved by routing devices external to the network. As described further below, INAD 265 may communicate with HSS/AAA server 240 to obtain identifying information regarding user device 205, and/or may communicate with PCRF 245 to obtain policy information (e.g., security policy information) regarding user device 205. INAD 265 may authenticate user device 205 based on information provided by user device 205, PGW 230, HSS/AAA server 240, and/or PCRF 245, and may provide information (e.g., encrypted information, such as an encrypted MDN, or "eMDN") to user device 205. The eMDN may be used by user device 205, as described below, to aid in the automatic authentication of user device 205 when accessing content provided by content provider 275. The eMDN, in some implementations, may be associated with a pre-shared symmetric key that may be stored by INAD 265 and AMS 270, and used by INAD 265 to generate (e.g., encrypt) the eMDN and by AMS 270 to decrypt the eMDN.

AMS 270 may include one or more devices that perform authentication services on behalf of user device 205. As described below, AMS 270 may handle authentication requests from user device 205, authenticate and/or identify user device 205, and notify content provider 275 regarding the authentication and/or identity of user device 205.

Content provider 275 may include one or more devices that provide content to user device 205. For example, content provider 275 may provide web-based content (e.g., web pages, video content, audio content, etc.) to user device 205. As another example, content provider 275 may provide other content, such as file streaming, virtual private network ("VPN") services, financial services, application services (e.g., video conferencing services, voice call services, etc.). Content provider 275 may communicate with AMS 270, in order to determine an authenticity and/or identity of user device 205, when user device 205 attempts to access content provided by content provider 275. In some implementations, content provider 275 may implement an application programming interface ("API"), provided by a provider associated with AMS 270, in order to communicate with AMS 270. The authentication, performed in conjunction with AMS 270, may in some implementations be an "alternate" form of authentication. For example, content provider 275 may allow for "traditional" authentication, in which a user associated with user device 205 provides credentials (e.g., a username and password), as well as for automatic authentication, as described herein. In other implementations, content provider 275 may only support authentication in accordance with implementations described herein.

FIGS. 3-6 illustrate example functional components of various devices (e.g., devices in environment 200). While specific examples of arrangements of modules are described below with respect to FIGS. 3-6, in other implementations, the various devices may include additional, fewer, different, and/or differently arranged modules. Further, the functionality of one module may be performed by one or more other modules. Also, the functionality of multiple modules may be performed by one module.

Figure 3:
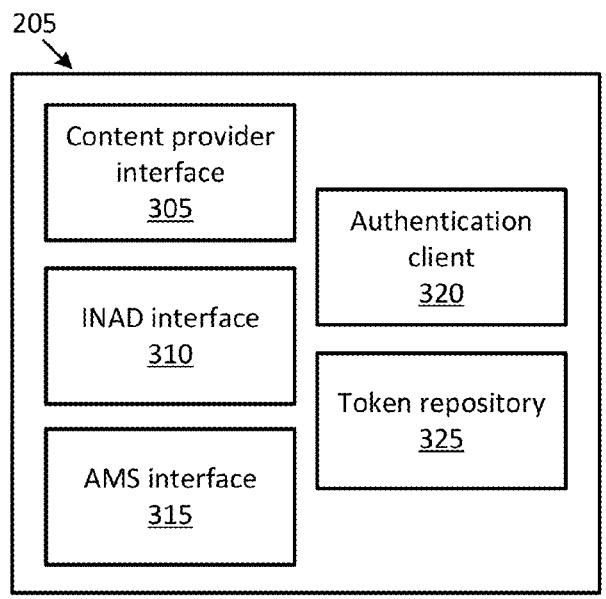
FIG. 3 illustrates example functional components of a user device, in accordance with one or more implementations.

FIG. 3, for example, illustrates example functional components of user device 205, in accordance with some implementations. As shown in FIG. 3, user device 205 may include content provider interface 305, INAD interface 310, AMS interface 315, authentication client 320 and token repository 325. Content provider interface 305 may be an interface via which user device 205 sends and/or receives information to content provider 275. For example, as described below, content provider interface 305 may be used to output a content request to content provider 275, output authentication-related information to content provider 275, and/or receive content from content provider 275. In some implementations, content provider interface 305 may include an API and/or a conventional type of interface (e.g., a network socket, such as an Internet socket).

INAD interface 310 may include an interface, such as an API and/or another type of interface, via which user device 205 communicates with INAD 265. As described below, user device 205 may send and/or receive authentication information to and/or from INAD 265, via INAD interface 310. For instance, INAD interface 310 may be used to output a device authentication request to INAD 265, and/or to receive an authentication token signed by INAD 265.

AMS interface 315 may include an interface, such as an API and/or another type of interface, via which user device 205 communicates with AMS 270. As described below, user device 205 may send and/or receive authentication information to and/or from AMS 270, via AMS interface 315. For instance, AMS interface 315 may be used to output an authentication request to AMS 270, provide additional credentials to AMS 270 if necessary, and/or to receive an authentication token signed by AMS 270.

Authentication client 320 may perform authentication functions as described herein. For example, in one implementation, authentication client 320 may be provided by content provider 275, in response to a request (by user device 205) for content from content provider 275. For instance, the request for content may be an HTTP request for a web page, and authentication client 320 may be provided by content provider 275 in response to the HTTP request. Authentication client 320, in some implementations, may be implemented as a script or other type of executable code. For example, authentication client 320 may be implemented as a JavaScript client, to be executed by user device 205. In some implementations, user device 205 may include logic and/or circuitry installed on user device 205 prior to a request, by user device 205, for content from content provider 275.

Authentication client 320 may perform functions for the authentication of user device 205, with respect to content provider 275, based on requests for content, made by user device 205. For example, as described above, in some implementations, authentication client 320 may be implemented as a JavaScript program, provided by content provider 275, that is invoked upon receipt from content provider 275. In some implementations, authentication client 320 may include an interface (e.g., an API), via which authentication client 320 communicates with other components of user device 205. For instance, authentication client 320 may communicate, via the API, with a browser program that provided the request to content provider 275.

Authentication client 320 may communicate with INAD 265 and/or AMS 270, in order to authenticate user device 205. In some implementations, authentication client 320 may receive and/or store identifying information associated with INAD 265 and/or AMS 270 (e.g., IP addresses and/or other information), which authentication client 320 may use to communicate with INAD 265 and/or AMS 270. Specific examples of communications, with INAD 265 and/or AMS 270, are described below (e.g., with respect to FIGS. 8-10). Briefly, authentication client 320 may output information, identifying user device 205, to INAD 265 and/or AMS 270, and may receive signed authentication tokens from INAD 265 and/or AMS 270 (that is, tokens signed by INAD 265 and/or AMS 270).

Authentication client 320 may store the signed authentication tokens in token repository 325. In some implementations, authentication tokens (e.g., as stored by token repository 325), signed by INAD 265 and/or AMS 270, may be provided to content provider 275, in order to authenticate user device 205.

Figure 4:
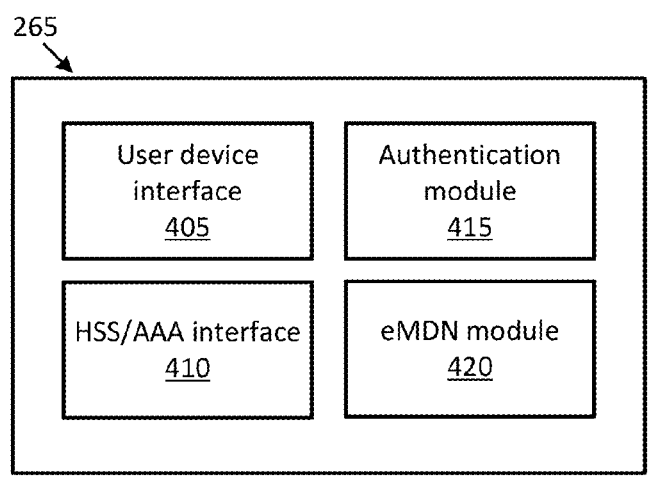
FIG. 4 illustrates example functional components of an in-network authentication device, in accordance with one or more implementations.

FIG. 4 illustrates example functional components of INAD 265. As shown, INAD 265 may include user device interface 405, HSS/AAA interface 410, authentication module 415, and eMDN module 420. User device interface 405 may include an interface, such as an API and/or another interface, via which INAD 265 may communicate with user device 205. For example, user device interface 405 may be used to receive authentication requests from user device 205 and/or to provide authentication tokens to user device 205.

HSS/AAA interface 410 may include an interface (e.g., an API and/or another type of interface), via which INAD 265 may communicate with HSS/AAA server 240. HSS/AAA interface 410 may be used to obtain identifying information (e.g., an MDN and/or other identifying information) associated with a particular user device 205. HSS/AAA interface 410 may obtain the information from HSS/AAA server 240 and/or another device that stores the identifying information. In some implementations, HSS/AAA interface 410 may obtain the information in response to an authentication request received from user device 205.

Authentication module 415 may perform authentication based on the authentication request from user device 205 and information obtained via HSS/AAA interface 410. For example, authentication module 415 may compare information in the authentication request (e.g., identifying information included in the authentication request) to the identifying information obtained via HSS/AAA interface 410, in order to authenticate user device 205. Additionally, or alternatively, authentication module 415 may request and/or receive information, from another device (such as a device, associated with a telecommunications network, involved in performing authentication processes), indicating that user device 205 has been authenticated. For example, authentication module 415 may request an MDN, associated with user device 205, from HSS/AAA server 240. The request may include the IP address of user device 205, based on which the MDN can be identified. The authentication may be performed based on hardware information (e.g., information associated with a Subscriber Identity Module ("SIM")) provided by user device 205 when user device 205 registers with the telecommunications network.

EMDN module 420 may generate an authentication token based on the identifying information. The authentication token may be, or may include, for example, an encrypted version of the identifying information (e.g., MDN) for user device 205. The authentication token, generated by eMDN module 420, may be thus sometimes referred to herein as an "eMDN." The eMDN may, in some implementations, include additional information, such as a timestamp indicating a time at which the eMDN was created and/or other information.

As mentioned above, INAD 265 may be a device that has access to information stored by HSS/AAA server 240 and/or other devices associated with a telecommunications network associated with a particular service provider. Because INAD 265 has access to potentially sensitive information, INAD 265 may, in some implementations, only be reachable by user device 205 when user device 205 is connected to the telecommunications network (e.g., via base station 210, provided by the same service provider). In other implementations, INAD 265 may be reachable via a network other than the particular telecommunications network.

Figure 5:
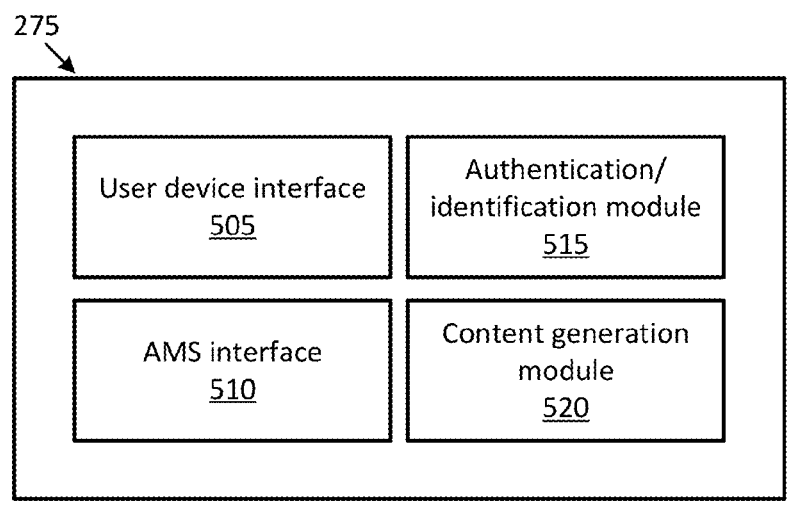
FIG. 5 illustrates example functional components of a content provider, in accordance with one or more implementations.

FIG. 5 illustrates example functional components of content provider 275, in accordance with some implementations. As shown, content provider 275 may include user device interface 505, AMS interface 510, authentication/identification module 515, and content generation module 520. User device interface 505 may include an interface (e.g., an implementation of an API) via which content provider 275 communicates with user device 205. For example, via user device interface 505, content provider 275 may receive requests for content and/or authentication from user device 205, may provide authentication client 320 to user device 205 (e.g., in the form of a JavaScript client), may receive authentication information from user device 205 (e.g., a token signed by authentication client 320), and may provide content (e.g., logged-in content, such as secure and/or personalized content) to user device 205.

AMS interface 510 may include an interface (e.g., an API), via which content provider 275 communicates with AMS 270. As described below, content provider 275 may send and/or receive, via AMS interface 510, data related to authenticating a particular user device 205. For example, the data may include an authorization request sent from content provider 275 to AMS 270 (which may, in some implementations, include a token signed by authentication client 320), an access token sent from AMS 270 to content provider 275, identifying information and/or profile information sent from AMS 270 to content provider 275, and/or other information.

Authentication/identification module 515 may handle authentication functions, in order to authenticate user device 205 (e.g., when an authentication request, for user device 205, is received via user device interface 505). For instance, as discussed above, authentication/identification module 515 may receive an authentication request from user device 205. The authentication request may, in some implementations, include a signed token. Authentication/identification module 515 may use one or more keys in order to authenticate the signature of the token. As described below, the token may be signed by authentication client 320 and/or by AMS 270. Thus, the one or more keys, used by authentication/identification module 515, may be public keys respectively associated with authentication client 320 and/or AMS 270.

As also described below, authentication/identification module 515 may output authorization requests to AMS 270 (e.g., via AMS interface 510). For example, based on a authenticating a token (e.g., by using the one or more keys mentioned above), authentication/identification module 515 may output an authorization request to AMS 270. The authorization request may, in some implementations, include the token. AMS 270 may, as described below, authenticate the token, and provide an access token and/or identification information, regarding user device 205, to authentication/identification module 515. Based on receiving the access token, authentication/identification module 515 may determine that user device 205 is authorized to access content provided by content provider 275. Further, based on the identification information, content provider 275 may provide access that is customized, based on the identity of user device 205.

For example, content generation module 520 may generate content, such as a web page, based on the identifying information regarding user device 205. The content may include personalized content, such as content based on user preferences, a location associated with user device 205 (e.g., as determined by a cellular network associated with user device 205), profile information associated with user device 205 (e.g., a user's name, address, email address, etc.), an MDN associated with user device 205, and/or other information. The content may additionally, or alternatively, include secure content, such as financial information, user account information, and/or other content that would generally be referred to as "secure" content, or "logged-in" content. Content generation module 520 may, in some implementations, provide the content to user device 205 via user device interface 505.

In some implementations, content generation module 520 may provide "placeholder," or non-personalized content to user device 205 before user device 205 is authenticated. That is, in some situations, the authentication process may take some time (e.g., one second, ten seconds, one minute, or some other amount of time). When content provider 275 initially receives a request for content, content generation module 520 may provide generic (e.g., placeholder and/or non-personalized) content, such as a generic web page that is not based on authenticating and/or identifying user device 205. In some implementations, the generic content may include an indication that user device 205 is being authenticated (e.g., a "loading bar" or other indicator). When user device 205 is authenticated, content generation module 520 may provide the customized content in a manner that replaces and/or supplements the generic content. For example, some generic content may remain, while additional, customized content is provided (e.g., a "Hello" message that includes the name of a user associated with user device 205, weather information associated with the user's present location, shopping recommendations, etc.).

Figure 6:
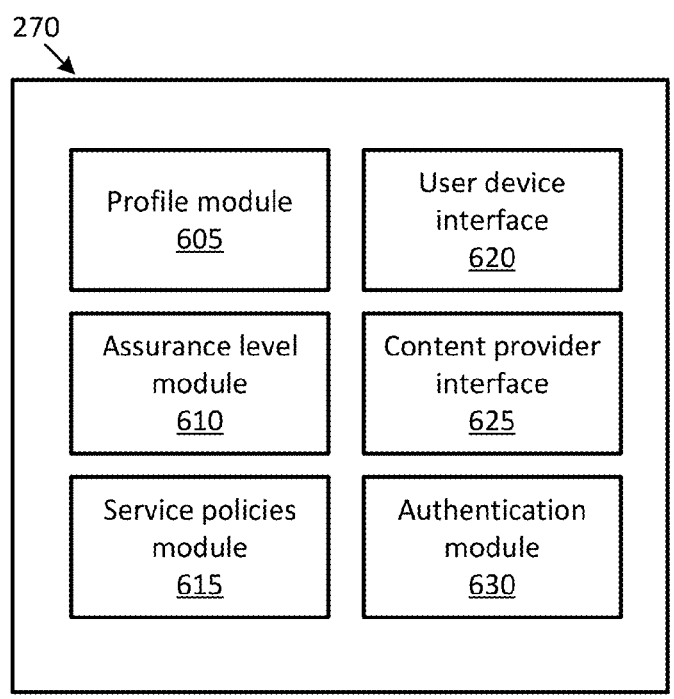
FIG. 6 illustrates example functional components of an authentication management system, in accordance with one or more implementations.

FIG. 6 illustrates example components of AMS 270, in accordance with some implementations. As shown, AMS 270 may include profile module 605, assurance level module 610, service policies module 615, user device interface 620, content provider interface 625, and authentication module 630. Modules 605-615 may include one or more data repositories that receive and/or store information. The information, stored by modules 605-615, may be received from one or more other devices that generate, obtain, and/or store the respective information. For example, modules 605-615 may receive information from HSS/AAA server 240, PCRF 245, and/or another device or set of devices.

Profile module 605 may receive and/or store profile information regarding user device 205. The profile information may include information regarding a user of user device 205 (e.g., a wireless telecommunications service subscriber), such as the user's name, address, present location, an identifier associated with the user, and/or other information. In some implementations, the profile information may include user credentials, which AMS 270 may use to authenticate a user associated with user device 205. As described below, the user credentials may be used in addition to, or in lieu of, network-based authentication techniques (e.g., in addition to, or in lieu of, an eMDN which may be received from user device 205). The user credentials may include a user name and password, biometric data (e.g., a set of fingerprints, a set of retinal scans, a set of voice samples, a passphrase, etc.), and/or other types of credentials. The profile information may be received from, for example, a user of user device 205 (e.g., during a registration process with AMS 270), and/or from another source.

FIG. 7 illustrates an example data structure 700, which may correspond to profile information received and/or stored by profile module 605. As shown, data structure 700 may include the following example fields: MDN, Username, Password, Address, and Other. Each record (e.g., each row in data structure 700) may store information associated with one particular user device 205. The "MDN" field, for a particular user device 205, may store an MDN associated with user device 205. In other implementations, data structure 700 may include one or more other identifiers in addition to, or in lieu of, an MDN. For example, data structure 700 may store an International Mobile Station Equipment Identity ("IMEI"), an International Mobile Subscriber Identity ("IMSI"), a Session Initiation Protocol ("SIP") address, and/or another identifier associated with user device 205. The "Username" and "Password" fields may correspond to credentials, associated with AMS 270, which may, in some situations, be used to authenticate user device 205. The "Other" field may include other credential information, as described above (e.g., biometric information and/or other information).

Returning to FIG. 6, assurance level module 610 may receive and/or store assurance level information, which may indicate a level of security associated with certain content providers 275 and/or a level of security associated with content associated with content providers 275. For example, assurance level information may indicate whether particular content (and/or content associated with a particular content provider 275) can be accessed using techniques described herein (e.g., automatic login techniques). The assurance level information may, in some implementations, indicate that additional credentials may be necessary. For example, a particular content provider 275 may provide sensitive financial information, and may thus require additional credentials from user device 205 before user device 205 can be authenticated. The additional credentials may include, for example, a user name and/or password, biometric information (e.g., a fingerprint scan, a retinal eye scan, a voice sample, etc.), and/or other additional information. The assurance level information may indicate what type (or types) of information is (or are) required, in order to authenticate user device 205.

The assurance level information may be received from content providers 275 and/or from another source. For example, using an API and/or another type of interface, a particular content provider 275 may indicate which type or types of additional verification may be necessary for authenticating user device 205 with respect to content provider 275. The additional verification may correspond to user credentials stored by AMS 270 (e.g., as described above with respect to profile module 605).

Service policies module 615 may receive and/or store service policy information, which may indicate whether automatic authentication techniques may be used (and/or whether a particular user device 205 should be allowed to access content provided by content provider 275). The service policy information may, for example, include location-based restrictions, parental controls, and/or other types of policies. For example, a location-based restriction may include a policy whereby user devices 205 outside of a particular country or region may not access content from a particular content provider 275. As another example, a parental control may indicate that a particular user device 205 (e.g., a user device associated with a minor, or a user device that has been designated as not authorized to access certain types of content and/or content associated with certain content providers 275) may not access content from a particular content provider 275. In some implementations, the security policy information may include timeout information. The timeout information may indicate, for example, how long a previous authentication is valid. For instance, if a previous authentication is no longer valid, AMS 270 may request additional credentials. The service policy information may be received from PCRF 245 and/or from another source.

User device interface 620 may include an interface (e.g., an API and/or another type of interface) via which AMS 270 may communicate with user device 205. For example, via user device interface 620, AMS 270 may receive requests for content and/or authentication from user device 205, may request additional credentials from user device 205 (e.g., based on assurance level information), and/or may provide a signed token to user device 205.

Content provider interface 625 may include an interface (e.g., an API and/or another type of interface) via which AMS 270 may communicate with content provider 275. For example, via content provider interface 625, AMS 270 may receive an authentication request (e.g., a request to authenticate user device 205) from content provider 275, and/or may provide an access token and/or profile information to content provider 275.

Authentication module 630 may authenticate user device 205 based on a request received from user device 205 and/or content provider 275. For example, as described in more detail below, authentication module 630 may receive an authentication request from user device 205. The authentication request may include a token signed by authentication client 320. In some such situations, authentication module 630 may authenticate the token (e.g., by using a key associated with authentication client 320). In some situations, the authentication request may also include an eMDN, which may indicate that user device 205 has been previously authenticated (e.g., in a network-based authentication process, by INAD 265). In other situations, the authentication request may not include an eMDN (e.g., in situations where network-based authentication was not performed, or was not able to be performed). If the authentication request does not include an eMDN (or if the eMDN is expired), or if additional credentials are necessary (e.g., based on assurance level information), authentication module 630 may request additional credentials from user device 205. Based on the eMDN (and, in some situations, the additional credentials), authentication module 630 may authenticate user device 205, and may generate a signed token. The token, signed by authentication module 630, may be provided to user device 205 (e.g., to authentication client 320).

As also described below, authentication module 630 may receive authentication requests, from content provider 275, to authenticate user device 205. These authentication requests may include, for example, a token signed by authentication module 630. The requests, from content provider 275, may also include identification requests (e.g., using a technique similar to that described in the Internet Engineering Task Force ("IETF") Request For Comments ("RFC") 6749, "The OAuth 2.0 Authorization Framework," by D. Hardt). Authentication module 630 may authenticate the token, and may provide any requested information to content provider 275.

Figure 8:
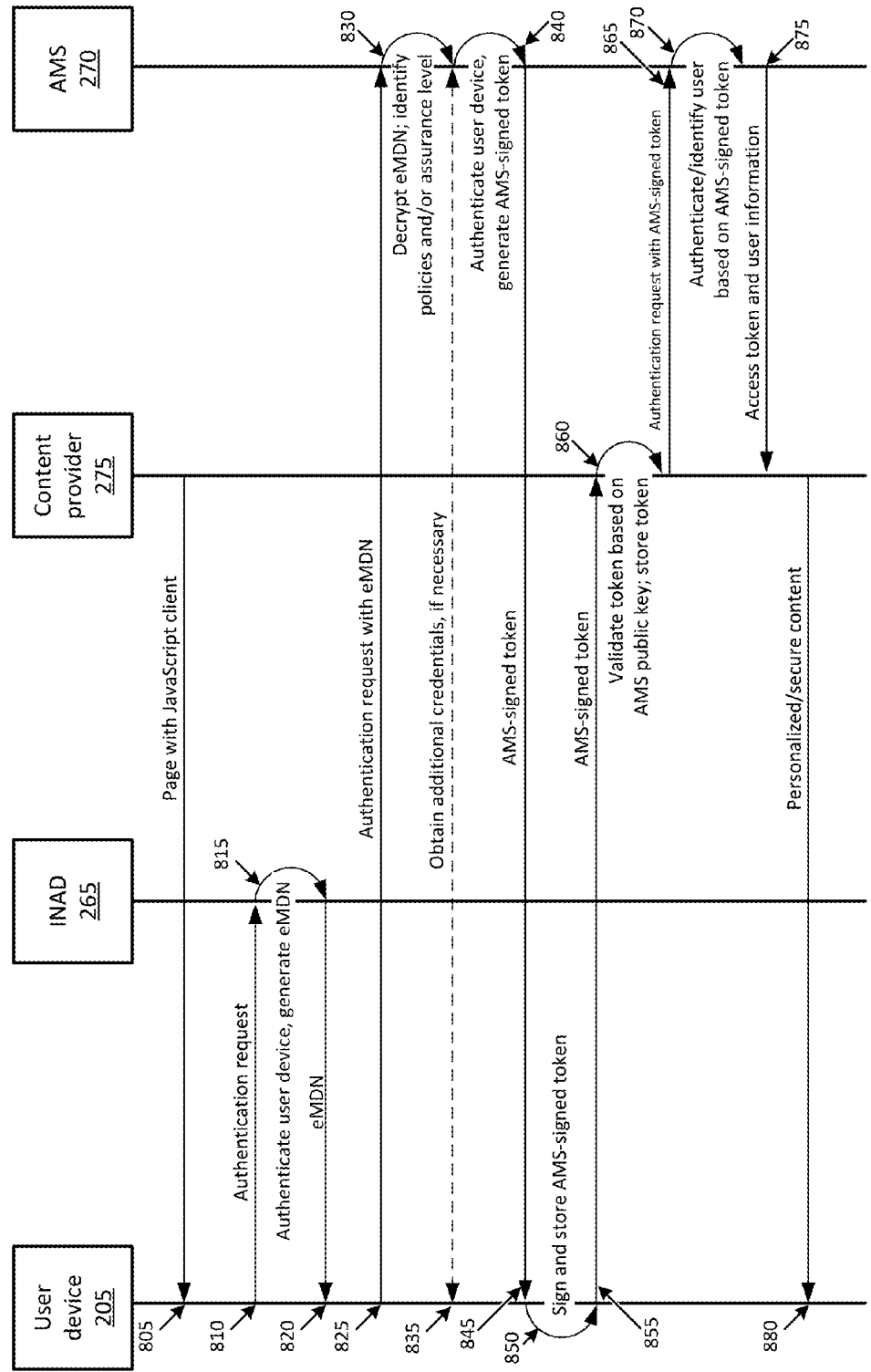
FIGS. 8, 9, 10A, 10B, and 11 illustrate example signal flows corresponding to performing network-based authentication of a user device for access to a third party content provider.

FIGS. 8-11 illustrate example signal flows related to automatically authenticating a user device, in accordance with some implementations described herein. Generally speaking, FIG. 8 illustrates an example scenario in which INAD 265 is reachable by user device 205 (e.g., user device 205 may be connected to the same telecommunications network as INAD 265), and in which content provider 275 does not store an authentication state for user device 205. For example, user device 205 may not have been previously authenticated by content provider 275, and/or at least a threshold amount of time may have elapsed since user device 205 was last authenticated by content provider 275.

Figure 9:
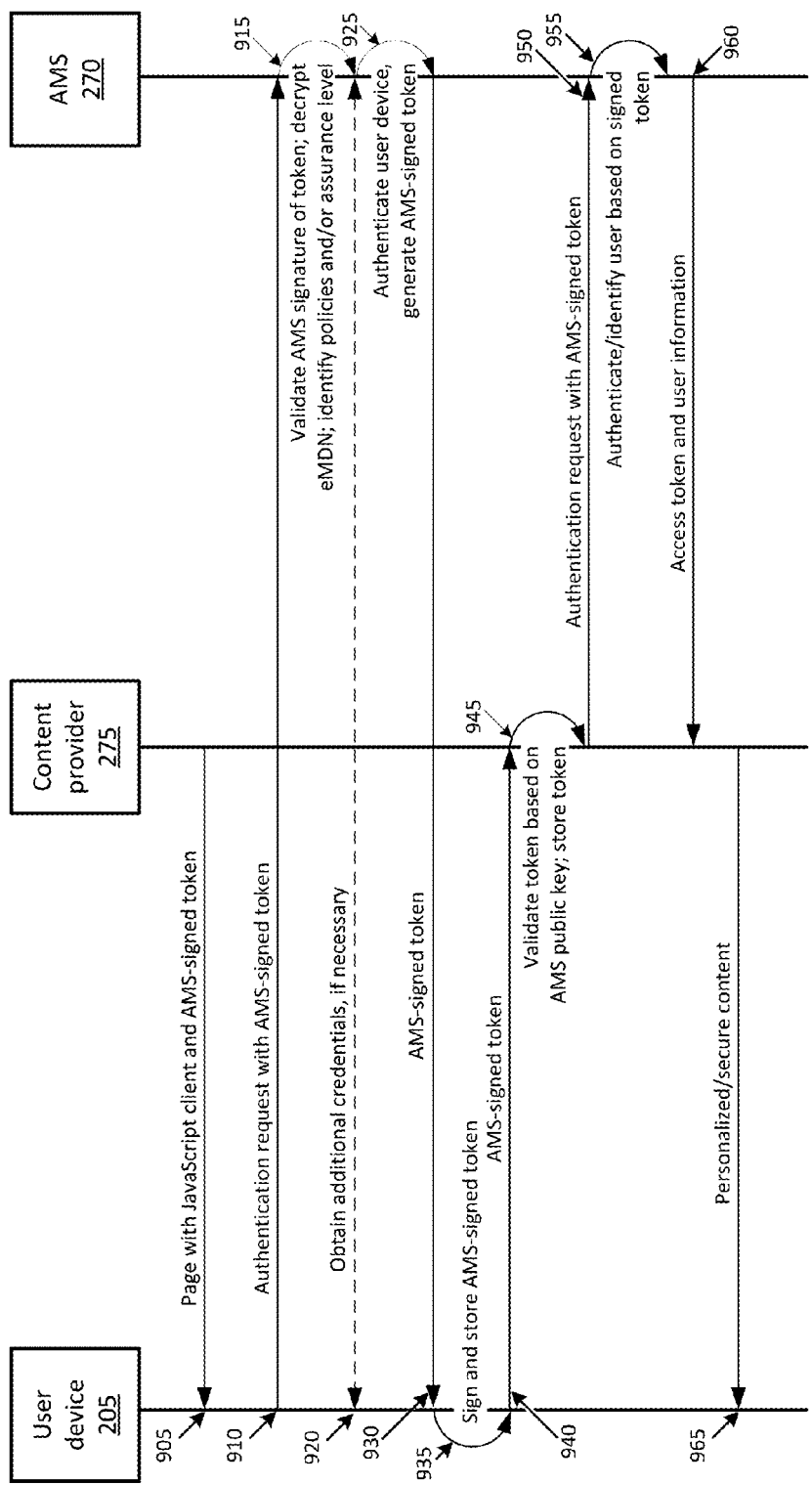

FIG. 9 illustrates an example scenario in which content provider 275 stores an authentication state for user device 205. For example, user device 205 may have been previously authenticated (e.g., according to the example shown in FIG. 8) for access to content provider 275.

Figure 10A:
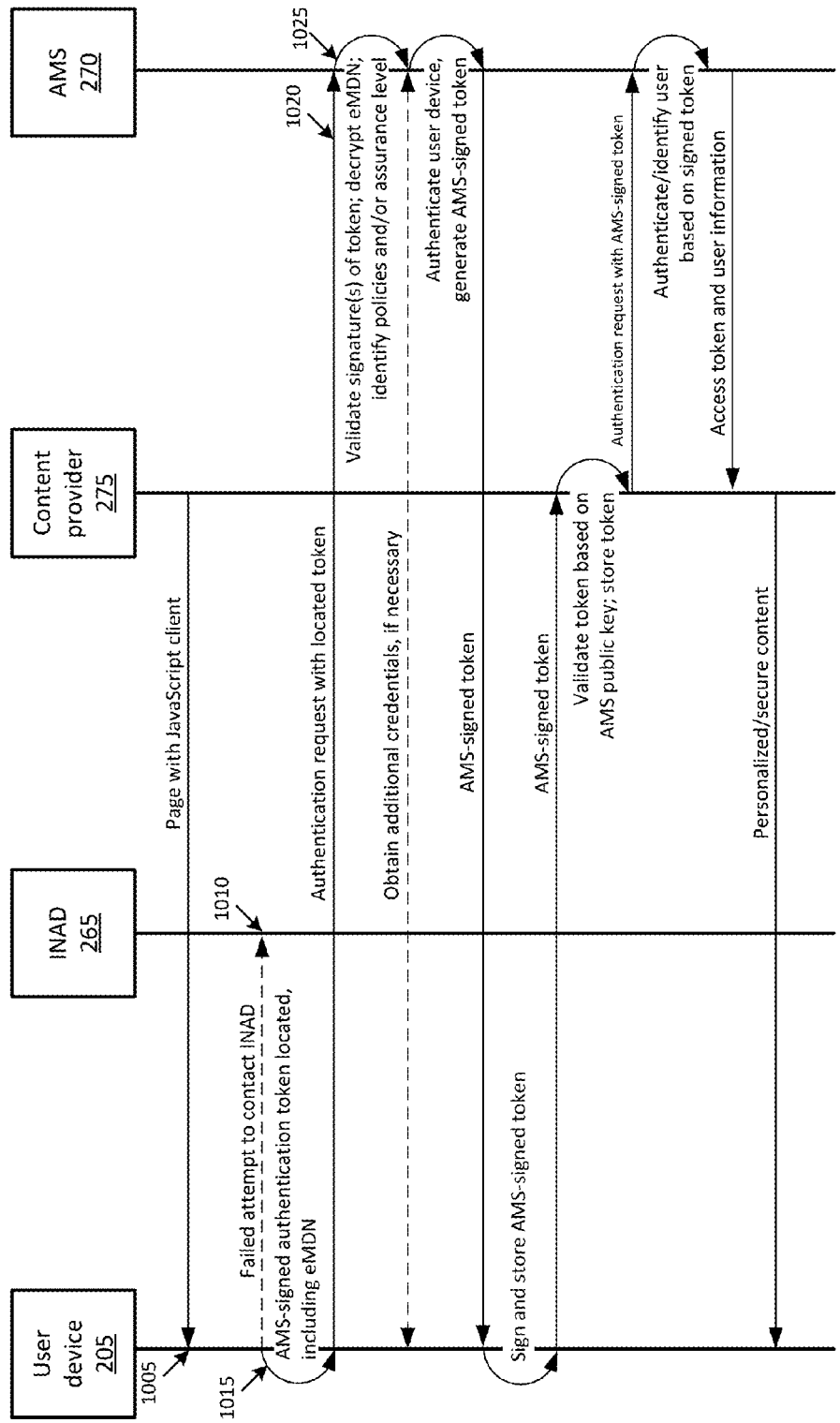
Figure 10B:
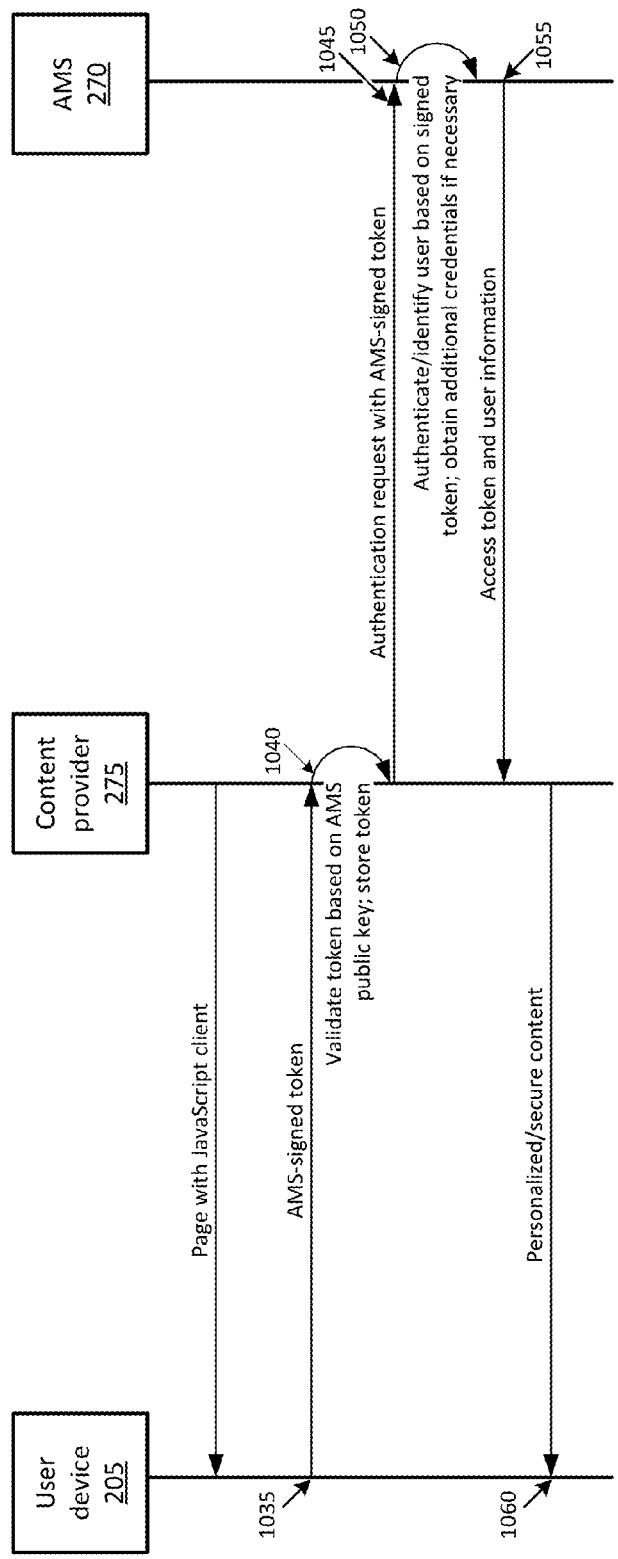

FIG. 10A illustrates an example scenario in which INAD 265 is not reachable by user device 205 (e.g., user device 205 may be "roaming" on a network external to a network with which INAD 265 is associated, and/or connected to a WiFi network and/or a different type of network), and in which user device 205 stores information regarding a previous authentication for access to content provider 275. The example, shown in FIG. 10A, may occur when user device 205 has been previously authenticated for access to content provider 275, but content provider 275 has not stored and/or has deleted authentication information associated with user device 205. FIG. 10B illustrates another example scenario, in which user device 205 stores information regarding a previous authentication. In the example shown in FIG. 10B, user device 205 may forgo communicating with AMS 270 in the authentication process.

Figure 11:
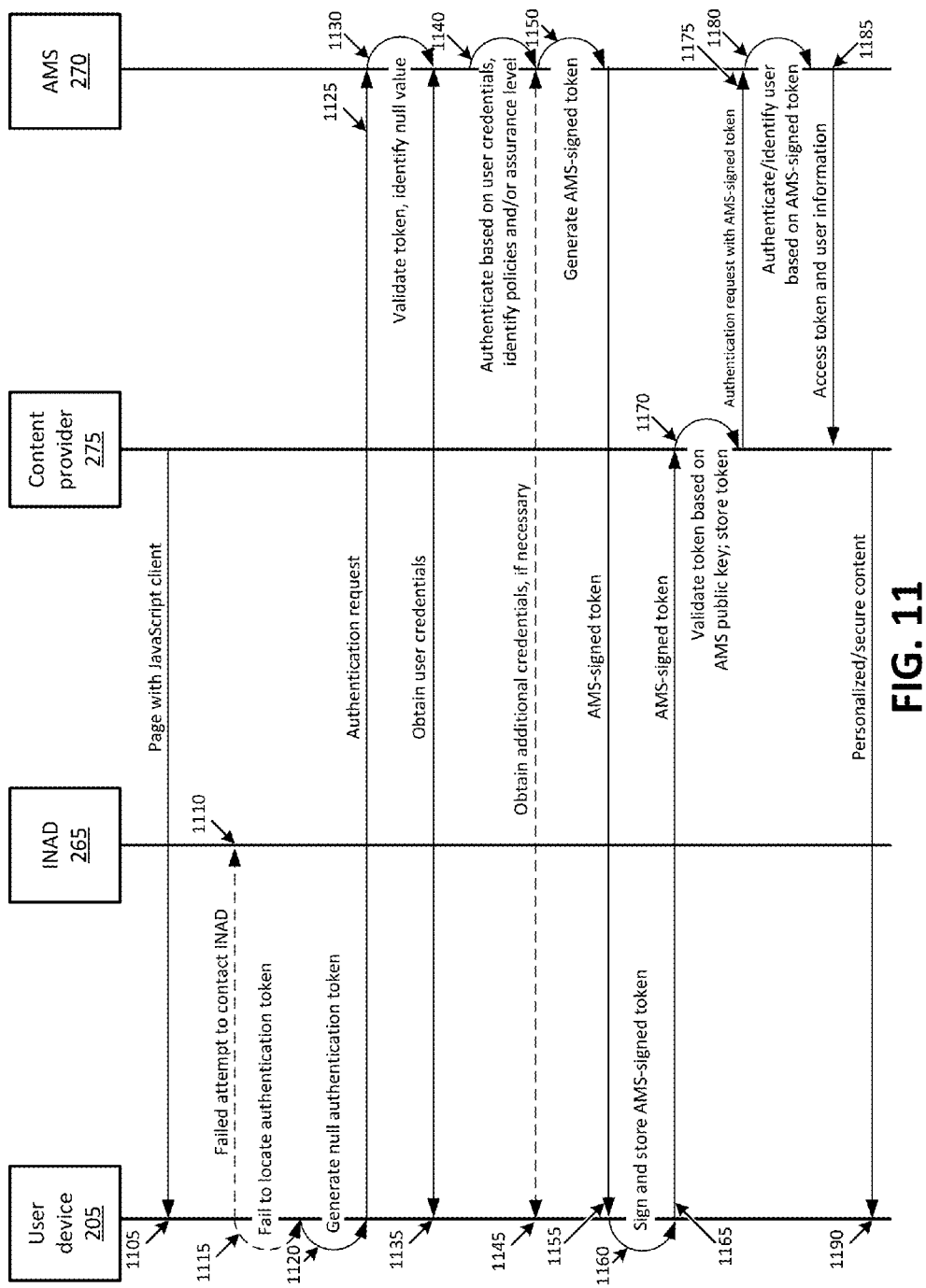

In the example scenarios illustrated in FIGS. 8-10B, credentials may only need to be obtained from user device 205 when service policies and/or assurance levels specify that additional credentials should be obtained (e.g., based on expired authentication and/or based on sensitivity of content, as specified by content provider 275). FIG. 11 illustrates an example scenario in which user device 205 has not been previously authenticated, and INAD 265 is not reachable by user device 205. The example shown in FIG. 11 may involve requesting credentials from user device 205, since network-based authentication (e.g., authentication involving INAD 265) may not be possible.

Signals in some figures may be similar to signals present in multiple figures. Thus, some of these signals may not be described in full detail with respect to each figure, for the sake of brevity. Further, while examples of how certain components may be implemented are described with respect to FIGS. 8-11, it is to be understood that other implementations are possible, in practice. For example, while described below in the context of a web page with a JavaScript client, authentication client 320 may be implemented differently in practice. Further, while content is described below in the context of a web page, other types of content may be provided, in practice.

As shown in FIG. 8, content provider 275 may output (at 805) a web page with a JavaScript client to user device 205. The JavaScript client may correspond to, for example, authentication client 320. The web page may be provided to user device 205 in response to a request for content (e.g., an HTTP request) from user device 205. The JavaScript client may include logic configured to communicate with (or attempt to communicate with) INAD 265. For example, the JavaScript client may include an address (e.g., an IP address) associated with INAD 265.

User device 205 may output (at 810) an authentication request to INAD 265. In this example, INAD 265 may be reachable by user device 205. For instance, user device 205 may be connected to the same network (e.g., a wireless telecommunications network) as INAD 265. The authentication request may include information identifying user device 205, such as an MDN, an IMSI value, an IMEI value, an IP address, and/or another value. As discussed above with respect to authentication module 415, INAD 265 may authenticate (at 815) user device 205 based on the authentication request. INAD 265 may also generate (at 815) an encrypted value, such as an eMDN, based on authenticating user device 205. INAD 265 may output (at 820) the eMDN to user device 205.

User device 205 may output (at 825) an authentication request, including the eMDN, to AMS 270. AMS 270 may decrypt (at 830) the eMDN in order to identify and/or authenticate user device 205. AMS 270 may also identify (at 830) service policies and/or assurance level information associated with content provider 275. As mentioned above (e.g., with respect to assurance level module 610 and service policies module 615), the service policy information may indicate, for example, whether the authentication should be allowed to continue, and the assurance level information may indicate which (if any) additional credentials are required for authentication.

If additional credentials are required (e.g., as indicated by the assurance level information), AMS 270 may obtain (at 835) the additional credentials from user device 205. The additional credentials may include, for example, a username and password, biometric information, and/or other credentials. AMS 270 may authenticate (at 840) user device 205 based on the decrypted eMDN (and, in some situations, the additional credentials). AMS 270 may generate (at 840) and sign a token (referred to as an "AMS-signed token"), which indicates that AMS 270 authenticated user device 205. The AMS-signed token may include other information, such as the eMDN, a timestamp (e.g., indicating a time at which the token was generated), and/or an identifier (e.g., a random number), which may be used by AMS 270 in subsequent authorization and/or identification operations, as described below.

As further shown, AMS 270 may output (at 845) the AMS-signed token to user device 205. User device 205 may sign (at 850) the AMS-signed token ("AMS- and user device-signed token"). The AMS- and user device-signed token may, in some implementations, be used in subsequent authentication operations. User device 205 may output (at 855) the AMS-signed token to content provider 275. Content provider 275 may validate (at 860) the AMS signature of the token using, for example, a public key associated with AMS 270.

Once the token has been validated as being associated with AMS 270, content provider 275 may output (at 865) an authentication request to AMS 270. This authentication request may include the AMS-signed token. AMS 270 may authenticate (at 870) the AMS-signed token (e.g., using a private key associated with AMS 270). As mentioned above, the authentication request may include a request for certain information associated with user device 205 (e.g., name of a user, address, present location, etc.). In some implementations, AMS 270 may identify user device 205, based on information included in the authentication request (e.g., based on a random number or other identifier assigned by AMS 270 previously, at 840).

Based on authenticating and identifying (at 870) user device 205, AMS 270 may output (at 875) an access token to content provider 275, as well as the requested user information (e.g., user profile information). As discussed above with respect to content generation module 520, content provider 275 may generate personalized and/or secure content for user device 205, and may output (at 880) the personalized and/or secure content. User device 205 may, for example, display the content via a web browser and/or another application.

As shown in FIG. 9, content provider 275 may provide (at 905) a web page with a JavaScript client to user device 205. User device 205 may store an AMS-signed token that was previously provided (e.g., at 845). User device 205 may locate the previously-received AMS-signed token, and may output (at 910) the AMS-signed token to AMS 270. As mentioned above, the AMS-signed token may include an eMDN that was previously generated by INAD 265. AMS 270 may validate (at 915) the AMS signature of the token (e.g., using a private key associated with AMS 270), decrypt the eMDN included in the token, and may identify policies and/or assurance level information associated with content provider 275. AMS 270 may obtain (at 920) additional credentials, if necessary, may authenticate (at 925) user device 205, and may generate an AMS-signed token.

The "new" AMS-signed token (generated at 925) may, in some implementations, be similar or identical to the "old" AMS-signed token provided (at 910) to AMS 270. In some implementations, the new AMS-signed token may include a more recent timestamp than the old AMS-signed token. The timestamp may be relevant in subsequent authentication procedures (e.g., may indicate whether an authentication has timed out). AMS 270 may output (at 930) the new AMS-signed token to user device 205.

User device 205 may sign and store (at 935) the AMS-signed token. The AMS- and user device-signed token may be used in subsequent authentication procedures, as described below. User device 205 may output (at 940) the AMS-signed token to content provider 275, which may validate and store (at 945) the token, and may output (at 950) an authentication request (including the AMS-signed token) to AMS 270. AMS 270 may authenticate and/or identify (at 955) user device 205, and may output (at 960) an access token and any requested user information to content provider 275. Content provider 275 may generate and output (at 965) personalized and/or secure content based on the access token and user information.

As shown in FIG. 10A, content provider 275 may provide (at 1005) a web page with a JavaScript client to user device 205. User device 205 may unsuccessfully attempt (at 1010) to contact INAD 265, and may locate (at 1015) an AMS-signed authentication token associated with content provider 275. The authentication token may have been obtained previously (e.g., at 845 in FIG. 8, and/or at 930 in FIG. 9). The AMS-signed authentication token may be, for example, a token signed by AMS 270. In some implementations, the AMS-signed authentication token may include an eMDN. Further, in some implementations, the AMS-signed token may further include a signature associated with user device 205.

User device 205 may output (at 1020) the located AMS-signed token (or, in some situations, the located AMS- and user device-signed token) to AMS 270. AMS 270 may validate the AMS signature (and, in some situations, the user device signature) of the token, decrypt the eMDN included in the token, and may identify (at 1025) policies and/or assurance level information. Once the signature(s) of the token have been validated (at 1025), the devices illustrated in this figure may perform similar operations as described above (e.g., with respect to FIGS. 8 and 9) in order to authenticate user device 205, and to provide personalized and/or secure content to user device 205.

As mentioned above, FIG. 10B illustrates another example of how an AMS-signed token, stored by user device 205, may be used to authenticate user device 205. In the example shown in 10A, user device 205 communicated with AMS 270 in order to validate the AMS-signed token, prior to providing the token to content provider 275. In the example shown in FIG. 10B, user device 205 may provide (at 1035) a previously-received AMS-signed token to content provider 275, instead of providing the AMS-signed token to AMS 270. Content provider 275 may validate (at 1040) the AMS-signed token based on a public key associated with AMS 270, and may store the token. Content provider 275 may output (at 1045) an authentication request, including the AMS-signed token, to AMS 270.

AMS 270 may authenticate and/or identify (at 1050) user device 205 based on the AMS-signed token, and may obtain additional credentials if necessary. For example, if an assurance level and/or policy indicates that additional credentials should be obtained (e.g., if content associated with content provider 275 is sensitive, if the previously obtained AMS-signed token has expired, etc.), AMS 270 may request the additional credentials from user device 205. Based on authenticating and identifying user device 205, AMS 270 may output (at 1055) an access token, as well as any requested user information, to content provider 275, which may output (at 1060) personalized and/or secure content to user device 205.

As shown in FIG. 11, content provider 275 may provide (at 1105) a web page with a JavaScript client to user device 205. User device 205 may attempt (at 1110) to contact INAD 265. For example, as described above with respect to authentication client 320, user device 205 may send a message destined for INAD 265, and the message may fail to reach INAD 265 (e.g., may "time out"). The attempt to contact INAD 265 may fail, for instance, if the address associated with INAD 265 is a private address associated with a particular network, to which user device 205 is not connected. In this situation, user device 205 may be "roaming." In other examples, INAD 265 may be unavailable due to an outage (e.g., a network outage) and/or a hardware failure.

Based on failing to contact INAD 265, user device 205 may attempt (at 1115) to locate a previously-received authentication token. In this example, the authentication token may not be available if user device 205 had not previously attempted to log in to content provider 275, if user device 205 had not been successfully authenticated to access content provider 275, and/or if any such prior authentication token was deleted.

Based on failing to locate a prior authentication token, user device 205 may generate (at 1120) a null authentication token. The null authentication token may be signed by authentication client 320. This signature may be used (e.g., by AMS 270) to identify content provider 275. That is, different application servers 275 may be associated with different authentication clients 320, and thus, different signatures. The null authentication token may include other information, such as identifying information associated with user device 205, a timestamp at which the null authentication token was created, and/or other information. User device 205 may output (at 1125) an authentication request to AMS 270. The authentication request may include the null authentication token (e.g., as generated at 1120).

AMS 270 may validate (at 1130) the token, and identify the null value of the token. For example, as described above with respect to authentication module 630, in order to validate the token, AMS 270 may use a key, associated with authentication client 320. The null value of the token may indicate that user device 205 should be manually authenticated (e.g., based on credentials provided by user device 205). AMS 270 may thus obtain (at 1135) user credentials from user device 205. The user credentials may be, for example, a username and password, biometric information, and/or other credentials. AMS 270 may authenticate (at 1140) user device 205 based on the obtained credentials (e.g., using profile information stored in profile module 605).

AMS 270 may also identify (at 1140) service policies and/or assurance level information associated with content provider 275. As mentioned above (e.g., with respect to assurance level module 610 and service policies module 615), the service policy information may indicate, for example, whether the authentication should be allowed to continue, and the assurance level information may indicate which (if any) additional credentials are required for authentication. If additional credentials are required (e.g., as indicated by the assurance level information), AMS 270 may obtain (at 1145) the additional credentials from user device 205.

Once user device 205 has been authenticated (e.g., based on credentials obtained at 1135 and/or additional credentials obtained at 1145), AMS 270 may generate (at 1150) an AMS-signed token. The AMS-signed token may include a value (e.g., a signature value) indicating that the token has been signed by AMS 270. In some implementations, the signed token may include an identifier (e.g., a random number), which may be used by AMS 270 in subsequent authorization and/or identification operations, as described below.

As further shown, AMS 270 may output (at 1155) the AMS-signed token to user device 205. User device 205 may sign and store (at 1160) the AMS-signed token. User device 205 may output (at 1165) the AMS-signed token to content provider 275. Content provider 275 may validate (at 1170) the AMS-signed token using a public key associated with AMS 270.

Once the token has been validated as being associated with AMS 270, content provider 275 may output (at 1175) an authentication request to AMS 270. This authentication request may include the AMS-signed token. AMS 270 may authenticate (at 1180) the AMS-signed token (e.g., using a private key associated with AMS 270). As mentioned above, the authentication request may include a request for certain information associated with user device 205 (e.g., name of a user, address, present location, etc.). In some implementations, AMS 270 may identify user device 205, based on information included in the authentication request (e.g., based on a random number or other identifier assigned by AMS 270 previously, at 1150).

Based on authenticating and identifying (at 1180) user device 205, AMS 270 may output (at 1185) an access token to content provider 275, as well as the requested user information (e.g., user profile information). In some implementations, AMS 270 may provide (at 1185) the access token to content provider 275, without outputting additional user information. Content provider 275 may subsequently request user information from AMS 270 and/or from another device. When subsequently requesting user information from AMS 270, content provider 275 may include the access token in the subsequent request. As discussed above with respect to content generation module 520, content provider 275 may generate personalized and/or secure content for user device 205, and may output (at 1190) the personalized and/or secure content. User device 205 may, for example, display the content via a web browser and/or another application.

Figure 12:
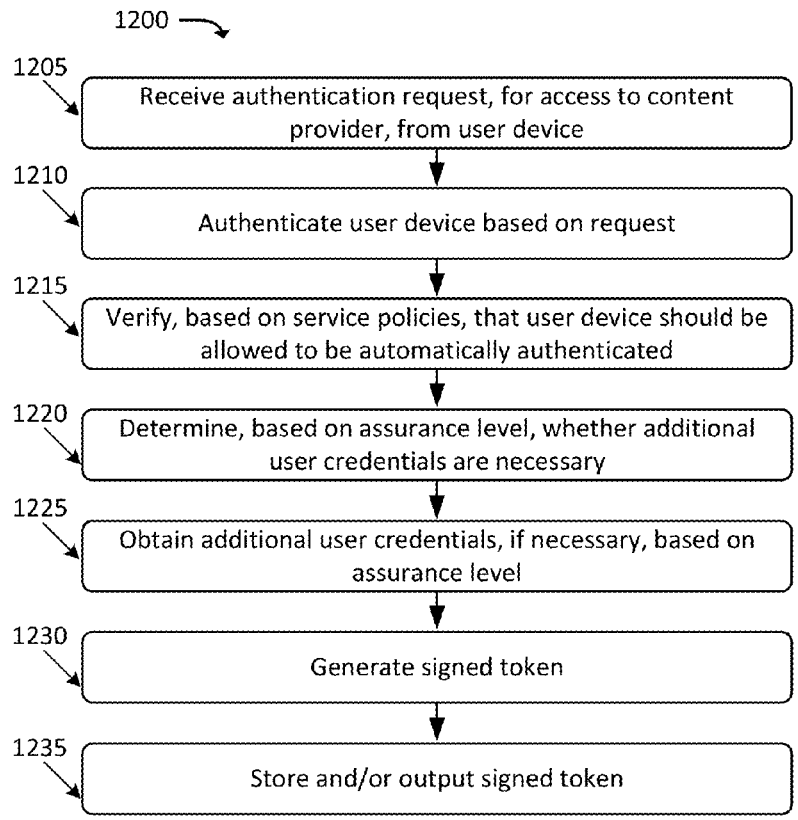
FIG. 12 illustrates an example process for generating an authentication management system-signed token, which may be used to authenticate a user device.

FIG. 12 illustrates an example process 1200 for authenticating a user device using network-based authentication. Process 1200 may generally relate to portions of the signal flows described above with respect to FIGS. 8-11. In some implementations, process 1200 may be performed by AMS 270. In other implementations, some or all of process 1200 may be performed by one or more other devices.

Process 1200 may include receiving (at 1205) an authorization request, for access to a content provider, from a user device. For example, as described above, AMS 270 may receive an authorization request, from user device 205, that indicates whether user device 205 was previously authenticated by INAD 265 and/or by AMS 270. For example, the request may include a null identification token, which may indicate that user device 205 was not previously authenticated. As another example, the request may include an eMDN and/or a signature from AMS 270, which may indicate that user device 205 was previously authenticated.

Process 1200 may also include authenticating (at 1210) the user device based on the request. For example, as described above, AMS 270 may request authentication credentials when the request includes a null identification token. As another example, AMS 270 may forgo requesting authentication credentials when the request includes an eMDN and/or a signature from AMS 270.

Process 1200 may further include verifying (at 1215), based on service policies, that the user device should be allowed to be automatically authenticated. For example, as described above, AMS 270 may determine that user device 205 should not be allowed to access content provider 275, and/or that user device 205 should not be allowed to be automatically authenticated in certain situations. Such situations may be based on, for example, parental controls, security protocols, etc.

Assuming that AMS 270 verified (at 1215) that the authentication should be allowed to continue, process 1200 may additionally include determining (at 1220), based on assurance level information, whether additional user credentials are necessary. For example, content provider 275 may have specified that additional user credentials are necessary, in addition to the automatic network-based authentication. Content provider 275 may specify that additional user credentials are necessary, for example, when content provider 275 provides secure or sensitive content, such as financial information.

Process 1200 may also include obtaining (at 1225) additional user credentials, if necessary, based on the assurance level information. For example, AMS 270 may request the additional user credentials, if specified by content provider 275.

Process 1200 may further include generating (at 1230) a signed token. For example, as described above, AMS 270 may generate an AMS-signed token, which may signify that user device 205 has been authenticated by AMS 270. The AMS-signed token may include a timestamp, which may aid in determining, at a later time, whether the AMS-signed token has expired or not. The AMS-signed token may also include an identifier associated with user device 205. The identifier may include a randomly-generated number (e.g., a number generated by AMS 270) and/or another identifier.

Process 1200 may additionally include storing and/or outputting (at 1235) the signed token. For example, AMS 270 may provide the AMS-signed token to user device 205. AMS 270 may store information regarding the identifier (e.g., the generated random number) of user device 205 for later use.

Figure 13:
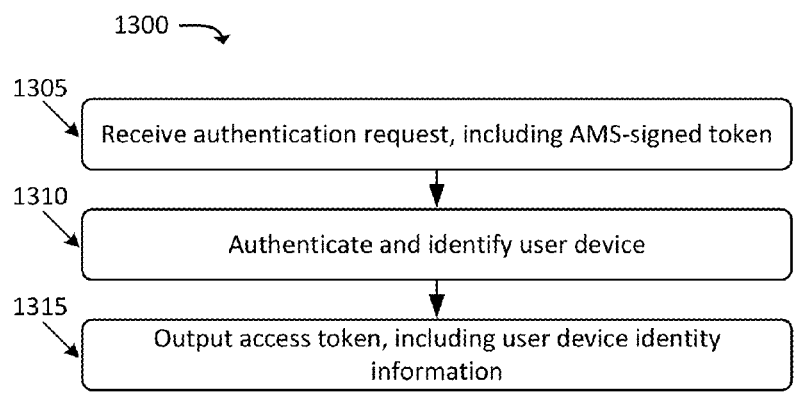
FIG. 13 illustrates an example of performing network-based authentication of a user device.

FIG. 13 illustrates an example process 1300 for authenticating a user device using an AMS-signed token. Process 1300 may generally relate to portions of the signal flows described above with respect to FIGS. 8-11. In some implementations, process 1300 may be performed by AMS 270. In other implementations, some or all of process 1300 may be performed by one or more other devices.

As shown, process 1300 may include receiving (at 1305) an authentication request, including an AMS-signed token. For example, as described above, AMS 270 may include an authorization request, from content provider 275, which may include an AMS-signed token. Content provider 275 may have obtained the AMS-signed token from user device 205, which may have obtained the token at a prior time from AMS 270, as described above. As also mentioned above, the authentication request may include a request for certain types of information regarding user device 205 (e.g., a user's name, address, present location, and/or other information).

Process 1300 may also include authenticating and identifying (at 1310) the user device. For example, as described above, AMS 270 may authenticate user device 205 based on the AMS- signed token. For instance, AMS 270 may use a private key, associated with AMS 270, to decrypt the AMS signature of the token, in order to verify the signature. As also described above, the authentication request may include an identifier (e.g., a random number previously assigned by AMS 270), which may be used by AMS 270 to identify user device 205, and locate a profile associated with user device 205.

Process 1300 may further include outputting (at 1315) an access token, including any requested user device identity information. For example, the access token may indicate, to content provider 275, that content provider 275 should grant access to user device 205 (e.g., that AMS 270 has authenticated user device 205 based on the AMS-signed token). AMS 270 may also output any requested information regarding user device 205.

Figure 14:
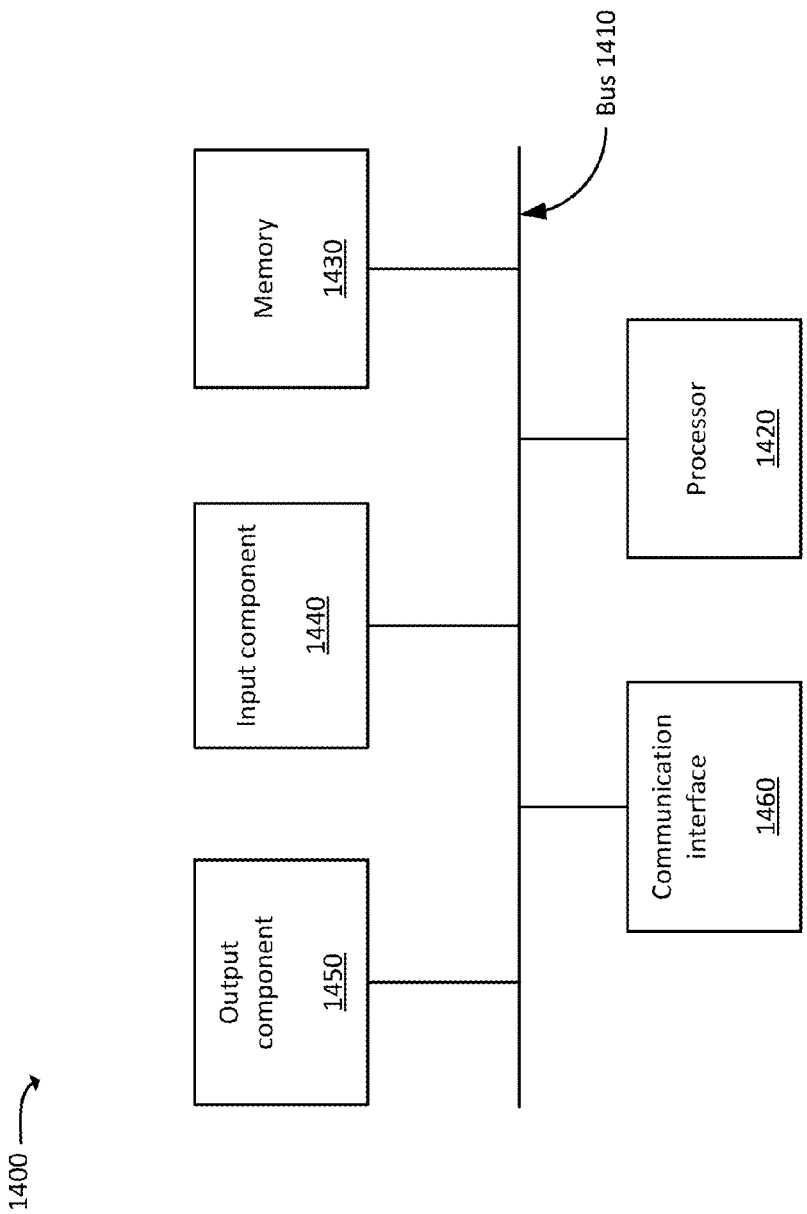
FIG. 14 illustrates example components of a device, in accordance with some implementations described herein.

FIG. 14 is a diagram of example components of device 1400. One or more of the devices described above may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while an example data structure is illustrated in FIG. 7 as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure. Additionally, while series of blocks and/or signals have been described with regard to FIGS. 8-13, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations are described herein in conjunction with thresholds. As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by a computing device and from a user device, a first authentication request to authenticate the user device, the first authentication request being associated with an attempt to access content provided by a content provider;
   authenticating, by the computing device and based on the first authentication request, the user device, the authenticating including:
      identifying an identifier included in the first authentication request, the identifier indicating that the user device has been previously authenticated by another device that is associated with a same telecommunications network as the user device;
   generating, by the computing device, a signed token based on authenticating the user device, the signed token including the identifier and a cryptographic signature for which a private key is stored by the computing device;

outputting, by the computing device and to the user device, the signed token;

receiving, by the computing device and from the content provider, a second authentication request associated with authenticating the user device for access to the content provider, the second authentication request including the signed token;

verifying, by the computing device, the cryptographic signature using the private key;

authenticating, by the computing device, the user device based on the identifier associated with the signed token included in the second authentication request; and providing, by the computing device, an access token to the content provider, based on verifying the cryptographic signature and authenticating the user device, the access token indicating that the user device should be authenticated.

2. The method of claim 1, wherein the second authentication request further includes a request for profile information regarding the user device, the method further comprising:

outputting the requested profile information, regarding the user device, to the content provider.

3. The method of claim 2, wherein an identity of the user device is determined based on the identifier included in the signed token, wherein the profile information is determined based on the determined identity of the user device.

4. The method of claim 3, wherein the profile information is used by the content provider to generate content that is customized based on the identity of the user device.

5. The method of claim 1, further including:

subsequently receiving, from the user device, a third authentication request to authenticate the user device, the third authentication request including the signed token; and authenticating the user device based on the signed token included in the third authentication request.

6. The method of claim 5, wherein authenticating the user device based on the signed token included in the third authentication request includes:

identifying a timestamp in the third authentication request, the timestamp indicating a time at which the signed token was generated; and determining, based on the timestamp, that the third authentication request has been received within a threshold amount of time since the signed token was generated.

7. The method of claim 1, further including:

subsequently receiving, from the user device, a third authentication request to authenticate the user device, the third authentication request including the signed token;

identifying a timestamp in the third authentication request, the timestamp indicating a time at which the signed token was generated;

determining, based on the timestamp, that the third authentication request has been received after a threshold amount of time since the signed token was generated;

and determining, based on determining that the third authentication request has been received after the threshold amount of time since the signed token was generated, that the user device should not be authenticated based on the signed token.

8. The method of claim 7, further comprising:

requesting, based on determining that the user device should not be authenticated based on the signed token, additional credentials from a user of the user device.

9. A computing device, comprising:

a memory device storing a set of processor-executable instructions; and a processor configured to execute the processor-executable instructions, wherein executing the processor-executable instructions causes the processor to:

receive, from a user device, a first authentication request to authenticate the user device, the first authentication request being associated with an attempt to access content provided by a content provider;

authenticate, based on the first authentication request, the user device, the authenticating including:

identifying an identifier included in the first authentication request, the identifier indicating that the user device has been previously authenticated by another device that is associated with a same telecommunications network as the user device;

generate a signed token based on authenticating the user device, the signed token including the identifier, the signed token including a cryptographic signature for which a private key is stored by the computing device;

output, to the user device, the signed token;

receive, from the content provider, a second authentication request associated with authenticating the user device for access to the content provider, the second authentication request including the signed token;

verify the cryptographic signature using the private key;

authenticate the user device based on the identifier associated with the signed token included in the second authentication request; and provide an access token to the content provider, based on verifying the cryptographic signature and authenticating the user device, the access token indicating that the user device should be authenticated.

10. The computing device of claim 9, wherein the second authentication request further includes a request for profile information regarding the user device, wherein executing the processor-executable instructions further causes the processor to:

output the requested profile information, regarding the user device, to the content provider.

11. The computing device of claim 10, wherein an identity of the user device is determined based on the identifier included in the signed token, wherein the profile information is determined based on the determined identity of the user device.

12. The computing device of claim 11, wherein the profile information is used by the content provider to generate content that is customized based on the identity of the user device.

13. The computing device of claim 9, wherein executing the processor-executable instructions further causes the processor to:

subsequently receive, from the user device, a third authentication request to authenticate the user device, the third authentication request including the signed token; and authenticate the user device based on the signed token included in the third authentication request.

14. The computing device of claim 13, wherein executing the processor-executable instructions, to authenticate the user device based on the signed token included in the third authentication request, further causes the processor to:
- identify a timestamp in the third authentication request, the timestamp indicating a time at which the signed token was generated; and
- determine, based on the timestamp, that the third authentication request has been received within a threshold amount of time since the signed token was generated.

15. The computing device of claim 9, wherein executing the processor-executable instructions further causes the processor to:
- subsequently receive, from the user device, a third authentication request to authenticate the user device, the third authentication request including the signed token;
- identify a timestamp in the third authentication request, the timestamp indicating a time at which the signed token was generated;
- determine, based on the timestamp, that the third authentication request has been received after a threshold amount of time since the signed token was generated; and
- determine, based on determining that the third authentication request has been received after the threshold amount of time since the signed token was generated, that the user device should not be authenticated based on the signed token.

16. A non-transitory computer-readable medium storing processor-executable instructions, which, when executed by one or more processors of a computing device, cause the one or more processors to:
- receive, from a user device, a first authentication request to authenticate the user device, the first authentication request being associated with an attempt to access content provided by a content provider;
- authenticate, based on the first authentication request, the user device, the authenticating including:
  - identifying an identifier included in the first authentication request, the identifier indicating that the user device has been previously authenticated by another device that is associated with a same telecommunications network as the user device;
- generate a signed token based on authenticating the user device, the signed token including the identifier, the signed token including a cryptographic signature for which a private key is stored by the computing device;
- output, to the user device, the signed token;
- receive, from the content provider, a second authentication request associated with authenticating the user device for access to the content provider, the second authentication request including the signed token;
- verify the cryptographic signature using the private key;
- authenticate the user device based on the identifier associated with the signed token included in the second authentication request; and
- provide an access token to the content provider, based on verifying the cryptographic signature and authenticating the user device, the access token indicating that the user device should be authenticated.

17. The non-transitory computer-readable medium of claim 16, wherein the second authentication request further includes a request for profile information regarding the user device, wherein the processor-executable instructions further include instructions to:
- output the requested profile information, regarding the user device, to the content provider.

18. The non-transitory computer readable medium of claim 17, wherein an identity of the user device is determined based on the identifier included in the signed token,
- wherein the profile information is determined based on the determined identity of the user device.

19. The non-transitory computer-readable medium of claim 18, wherein the profile information is used by the content provider to generate content that is customized based on the identity of the user device.

20. The non-transitory computer-readable medium of claim 16, wherein the processor-executable instructions further include instructions to:
- determine a geographic location of the user device,
- wherein authenticating the user device based on the identifier associated with the signed token provided in the second authentication request is further based on determining whether the geographic location of the user device is subject to a location restriction.

* * * * *